April 5, 1938.  H. J. NEDERMAN  2,113,548
INSECT EXTERMINATOR
Filed April 20, 1936
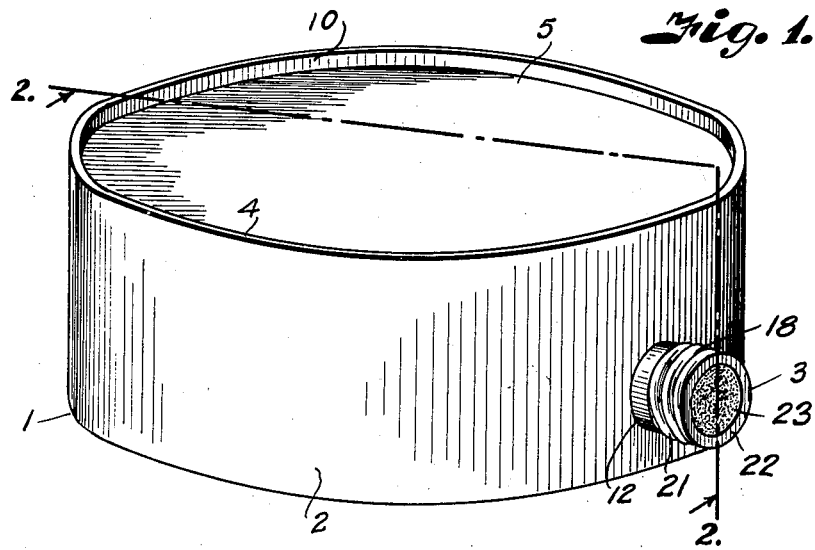
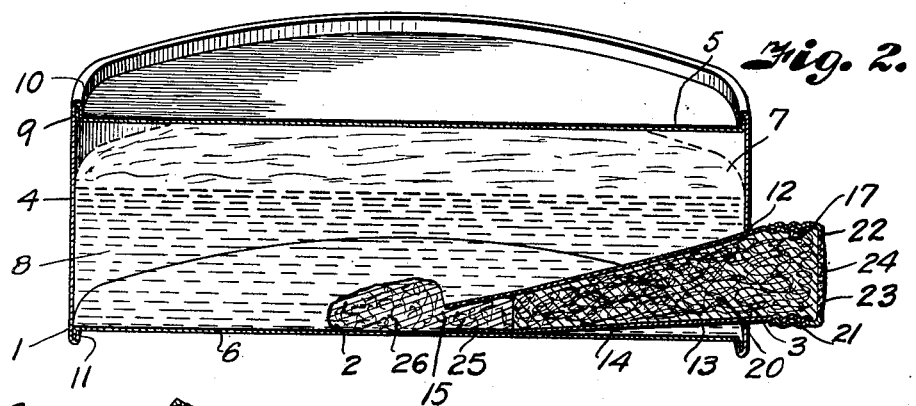
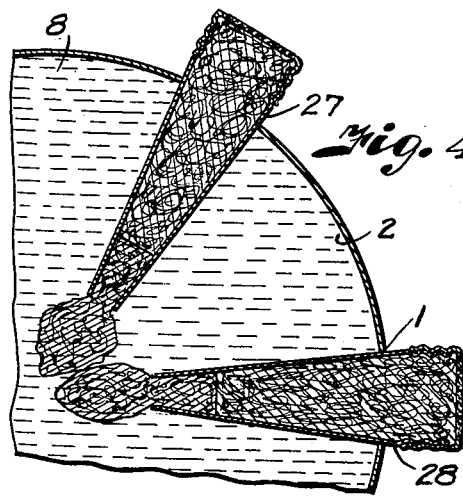
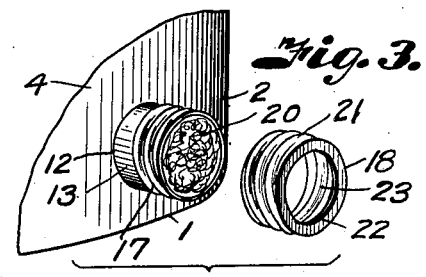
INVENTOR
Harold J. Nederman,
BY
ATTORNEY Patented Apr. 5, 1938

2,113,548

UNITED STATES PATENT OFFICE 2,113,548

INSECT EXTERMINATOR

Harold J. Nederman, Kansas City, Mo., assignor to Permanent Mothproof Company, Kansas City, Mo., a co-partnership consisting of Oscar S. Schaffer, Harold J. Nederman, Ada Richard, and Phineas Rosenberg Application April 20, 1936, Serial No. 75,302

8 Claims. (Cl. 43—131)

This invention relates to insect exterminators and particularly to a device for dispensing a liquid insecticide that is capable of attracting and exterminating various insects, such as roaches, water-bugs, ants, etc., and has for its principal object to provide a device of this character wherein the exterminating liquid is automatically fed from the dispenser in proportion to its consumption by the insects which are attracted to it; to provide a dispenser wherein the liquid is rendered readily accessible to the insects without dripping; to provide a dispenser construction wherein the hydrostatic head of liquid has little or no influence on the rate of feed; and to provide the outlet of the dispenser with a wicking material having capillaries proportioned according to viscosity of the liquid so that the liquid, upon exposure to air, cakes over the outlet.

Other important objects of the invention are to provide a container having no air inlet other than through the wicking material; to provide a simple and inexpensive container construction; and to provide a container that may be completely filled with the liquid insecticide.

It is also an important object of the present invention to provide a container shaped so that it may be inserted in cabinets or under refrigerators, or in other out-of-the-way places frequented by insects.

In accomplishing these and other objects of the invention, I have provided improved details of structure, the preferred forms of which are illustrated in the accompanying drawing, wherein:

Fig. 1 is a perspective view of an insect exterminator embodying the features of the present invention.

Fig. 2 is a cross-section through the exterminator on the line 2—2 of Fig. 1.

Fig. 3 is a fragmentary perspective view of the liquid outlet showing the retaining cap for the wicking material removed therefrom.

Fig. 4 is a fragmentary horizontal section through a portion of a container provided with a plurality of outlets that are arranged radially about the periphery thereof.

Referring more in detail to the drawing:

1 designates an insect exterminator including a container 2 having a liquid outlet 3 through which an insecticide is dispensed from the container for access by the insects to be exterminated. The container 2 may be of various shapes and sizes depending upon the nature of its use and the capacity required. In the illustrated instance, the container 2 includes a cylindrical wall 4 and upper and lower heads 5 and 6 that are connected at their peripheries with the upper and lower portions of the wall to form a liquid-tight compartment 7 for containing the insecticide indicated at 8. The peripheries of the heads are shown as provided with perpendicular flanges 9 engaged with retractively bent flanges 10 and 11 of the wall 4, as in conventional can construction, the flanges being soldered or otherwise sealed to enhance the fluid-tight character of the joints.

Formed in the wall 4, at a point spaced slightly above the lower head 6, is an opening 12 in which is mounted an outlet nozzle 13 sealed in said opening and forming the outlet 3 for the insecticide 8. The nozzle 13 comprises a substantially frusto-conical tube 14 having its smaller end 15 extending within the container and resting upon the inner face of the head 6. The larger end 16 of the nozzle is offset axially above the axis of the smaller end and projects through the opening 12 to terminate in a threaded neck 17 to mount a screw threaded cap 18 for retaining a wicking material 20 within the nozzle.

The cap 18 includes a threaded skirt portion 21 engageable with the threads of the neck and an internally extending flange 22 overlapping the outlet of the neck and forming a reduced opening 23. The wicking material preferably consists of a mixture of two fibrous materials, one capable of expansion and the other of contraction when saturated by the insecticide liquid, for example the materials may consist of a mixture of cotton and wool so proportioned that when the nozzle is filled with the material the capillaries therein are such as to automatically regulate the flow of liquid from the container at a rate to cause caking thereof, as indicated at 24, in Fig. 2 when the liquid is contacted by air through the opening 23. The caking 24 thus forms a stop to prevent continuous dripping of the liquid responsive to hydrostatic pressure in the container. Tendency of the liquid to drip prior to the formation of the cake is substantially lessened by reason of the relatively small end 15 of the nozzle; however, the outlet opening at the larger end 16 is of sufficient diameter to allow ample exposed area over which the cake is formed.

In order to provide a safety feature and prevent displacement of the liquid from the container, the inner end of the nozzle is closed by a second plug of wicking material 25 that may be formed of absorbent cotton or the equivalent. This wicking preferably extends out into the container, as shown at 26, to provide an extended surface for absorbing the liquid and feeding it through the constricted inlet of the nozzle. It is obvious that should the wicking material 20 be withdrawn for any reason, the wicking 25 will remain in place to prevent accidental discharge of the liquid.

In filling the device the cap is removed from the neck 17 together with the wicking material, and the container is completely filled with liquid through the nozzle. When the container is being filled it is supported with the bottom 6 uppermost. The small end of the nozzle is then directly under the bottom so that the container may be filled to almost its full capacity. The liquid is then injected through the open end of the nozzle by connection of a special tube (not shown) which allows displacement of the air through the nozzle about the filling tube simultaneously with the inlet of the liquid. After the container is filled, the nozzle is then packed with the wicking material after which the cap 18 is applied to the threaded neck 17 to prevent dislodgment of the wicking. When the container is righted, the liquid therein is caused to move by capillary action through the capillaries in the respective wickings toward the outlet opening 23.

Upon contact of the liquid with the air, the liquid forms the cake 24 within the opening of the cap to seal the container and prevent evaporation and flow of the liquid except as the cake is consumed. The caked liquid attracts the insects, and when it is consumed causes their extinction. As the cake is removed additional liquid flows by capillary action to maintain the caked condition within the opening 23.

The form of the invention illustrated in Fig. 4 is identical to that of the preferred form with the exception that the wall thereof is provided with a plurality of nozzle outlets, as indicated at 27 and 28, and functions in substantially the same manner as that shown in the preferred form of the invention.

From the foregoing, it is obvious that I have provided a simple, inexpensive container that automatically feeds an insecticide for ready access by insects to be exterminated, particularly cockroaches and the like. The container, being of relatively flat shape, holds an adequate supply of the liquid, but may be placed in out-of-the-way locations most frequented by the insects to assure their attraction and extermination when they consume the caking liquid. Owing to the fact that the liquid cakes over the wick material, the cake forms a liquid seal to prevent continuous capillary displacement of the liquid. The caking not only closes the capillaries to the egress of the liquid, but it also prevents admission of air into the container that might cause displacement of the liquid incidental to its hydrostatic head.

What I claim and desire to secure by Letters Patent is:

1. A device of the character described including a container for a liquid insecticide, a nozzle seatingly supported in a wall of the container and having a frusto-conical interior with its smaller end within the container and its larger end opening from the container, and a fibrous material filling the nozzle and having capillaries for feeding the liquid through the nozzle toward its larger end for access by insects to be exterminated.

2. A device of the character described including a container for a liquid insecticide, a nozzle seatingly supported in a wall of the container having a frusto-conical interior with its smaller end within the container and its larger end projecting from the container, and a fibrous material filling the nozzle and having capillaries for feeding the liquid through the nozzle toward its larger end for access by insects to be exterminated.

3. A device of the character described including a container having bottom and side walls, a truncated cone-shaped nozzle supported by the side wall of the container with its smaller end within the container and resting substantially on the bottom wall, and a fibrous material filling the nozzle and having capillaries for feeding a liquid insecticide from the container through said nozzle toward its larger end for access by insects to be exterminated.

4. A device of the character described including a container having bottom and side walls, a truncated cone-shaped nozzle supported by the side wall of the container with its smaller end within the container and resting substantially on the bottom wall, a fibrous material filling the nozzle and having capillaries for feeding a liquid insecticide from the container through said nozzle toward its larger end for access by insects to be exterminated, and a cap on the larger end of the nozzle for retaining the fibrous material and having an opening for exposing a portion of said material.

5. A device of the character described including a container having bottom and side walls, a nozzle seatingly supported by the side wall of the container in inclined relation to said bottom and forming a passageway for the discharge of a liquid insecticide with the outlet end at a higher level than the inlet end, a fibrous material filling the passageway and having capillaries for feeding the liquid insecticide from the container through said nozzle at a predetermined rate for access by insects to be exterminated, and a cap on the outer end of the nozzle for retaining the fibrous material and having an opening for exposing a portion of said material.

6. A device of the character described including a container having bottom and side walls, a truncated cone-shaped nozzle supported by the side wall of the container with its smaller end within the container and resting substantially on the bottom wall, a fibrous material filling the nozzle and having capillaries for feeding a liquid insecticide from the container through said nozzle toward its larger end at a predetermined rate to effect caking of the liquid insecticide upon exposure to air, and a cap on the larger end of the nozzle for retaining the fibrous material and having an opening for exposing said cake portion of the insecticide.

7. A device of the character described including a container for a liquid insecticide, a nozzle seatingly supported in a wall of the container and having a frusto-conical interior with its smaller end within the container and its larger end projecting from the container, a plug formed of fibrous material filling the smaller end of the nozzle and having capillaries for feeding the liquid into the nozzle, a second plug formed of fibrous material filling the larger end of the nozzle and having capillaries to continue feed of the liquid for access by insects to be exterminated, and a cap on the larger end of the nozzle for retaining the last named fibrous material and having an opening for exposing a portion of said material.

8. A device of the character described including a container for a liquid insecticide, an interiorly truncated cone-shaped nozzle supported in a wall of the container with its smaller end within the container and its larger end projecting from the container, a plug of fibrous material closing the smaller end of the nozzle and having an extended surface in the container for feeding the liquid through the restricted end of the nozzle, and a second plug of fibrous material having capillaries to continue feed of the liquid for access by insects to be exterminated.

HAROLD J. NEDERMAN.